Figure 1:
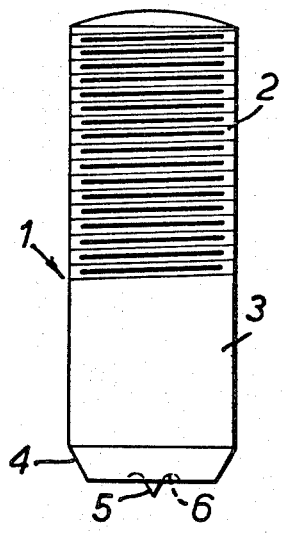

United States Patent [19]
Molyneux et al.

[11] 3,975,107
[45] Aug. 17, 1976

[54] ANCHORAGE STUDS
[75] Inventors: George Molyneux; George Walter Molyneux, both of Gloucester, England
[73] Assignee: Molyneux Engineering Company Limited, Gloucester, England
[22] Filed: Mar. 3, 1975
[21] Appl. No.: 554,459

Related U.S. Application Data
[62] Division of Ser. No. 225,577, Feb. 11, 1972, Pat. No. 3,891,332.

[30] Foreign Application Priority Data
Feb. 11, 1971 United Kingdom............ 4418/71
Sept. 3, 1971 United Kingdom............ 41160/71

[52] U.S. Cl. ........................... 403/271; 52/758 B
[51] Int. Cl.² ............................................. F16B 9/00
[58] Field of Search ........ 403/270, 271, 272, 265, 403/267, 266, 13; 151/41.7; 52/758 B; 219/99, 98

[56] References Cited
UNITED STATES PATENTS

| | | | |
|---|---|---|---|
| 2,760,797 | 8/1956 | Woodling | 219/99 |
| 2,790,656 | 4/1957 | Cook | 403/270 |
| 3,003,601 | 10/1961 | Ott | 403/270 |
| 3,145,288 | 8/1964 | Woodling | 219/99 |

*Primary Examiner*—Andrew V. Kundrat
*Attorney, Agent, or Firm*—Young & Thompson

[57] ABSTRACT

An anchorage stud or bolt designed to be welded to a base metal surface, the end of the stud being formed with a small conical projection surrounded by an annular groove to fit in a conical depression with a crater lip formed in the base surface. The surrounding lower edge of the stud has an undercut to receive weld metal by which the stud is anchored to the base surface.

2 Claims, 8 Drawing Figures

ANCHORAGE STUDS

This is a division, of application Ser. No. 225,577, filed Feb. 11, 1972 and now U.S. Pat. No. 3,891,332.

This invention relates to studs, bolts, pins or like members designed to be attached by welding to a metal supporting surface, and to methods of attaching such members in position.

In various applications, for example when attaching anchorage studs to a base metal flange for locating the anchorage clips of a track rail, as used in supporting heavy duty cranes, it is important that the studs should be accurately positioned and it is also particularly important that the welded connection should be of good quality and not liable to fatigue failure or other deficiencies. In practice, however, it may be difficult to provide for accurate location of the stud without interfering with the effectiveness of the welded connection.

According to the present invention there is provided a stud, bolt, pin or like member formed for attachment by welding at one end to a metal surface having a punched depression for location purposes, said one end surface being generally flat but formed with a central projection.

Preferably the projection will be slightly smaller than the depression in the opposing metal surface so that the end of the stud locates firmly against that surface. The depression will normally be formed by a conventional punch with a conical tapered end, and by this method a slightly raised "crater lip" will be formed around the edge of the depression. To accommodate this lip, it is preferred to form the end surface of the stud with an annular groove surrounding the projection.

For an efficient weld, it is preferred to cut away the junction of said end surface with the longitudinally extending surface of said member so that a weld fillet is accommodated therein.

This cutaway may be a chamfer or an undercut groove formation. The undercut groove may take the form of a conical surface widest at the base of the stud and merging into a radiused shoulder near the bottom of the stud.

The stud may be screw-threaded over at least its upper portion, it may have a head fixed thereon or integral therewith, or it may be formed as a rag bolt, with a plurality of shallow annular grooves each with a surface extending inwardly towards the free end of the bolt and a second surface which is approximately perpendicular to the axis of the bolt. The lower end of the stud in most applications will be circular, but it may be squared.

According to another aspect of the present invention there is preferred a welded construction including a member as defined above secured by welding to an opposing metal surface having a punched locating depression with the projection at the end of the stud lying in said depression.

In such a construction with a member cutaway at the bottom, a fillet weld fills that cutaway and may extend a short distance above it.

This construction may be used to secure the clamps for a rail supported along a metal girder that provides said surface to which the studs are welded. Square based studs may be used for this, in which case it is preferred to weld them so that the square diagonals are parallel and perpendicular to the rail. This avoids welding directly across the planes of stress.

Figure 2:
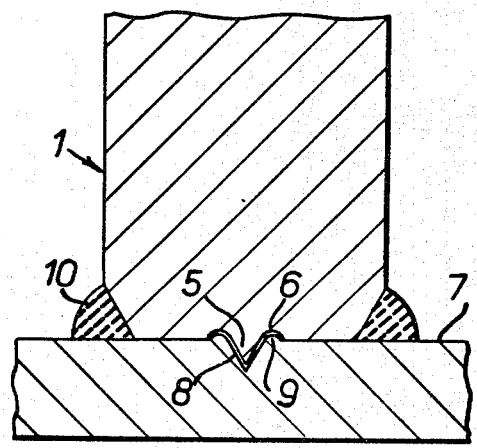
Figure 3:
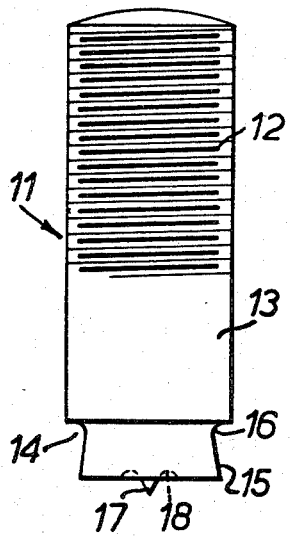
Figure 4:
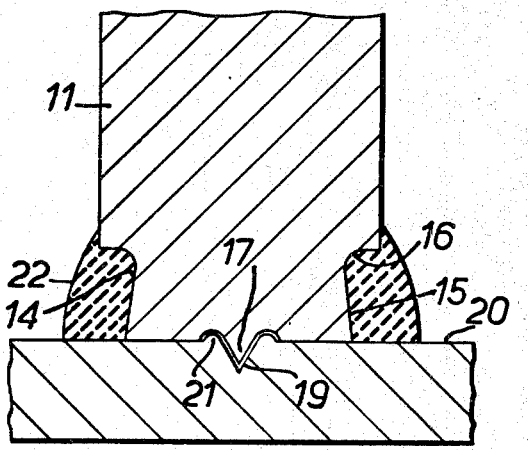
Figure 5:
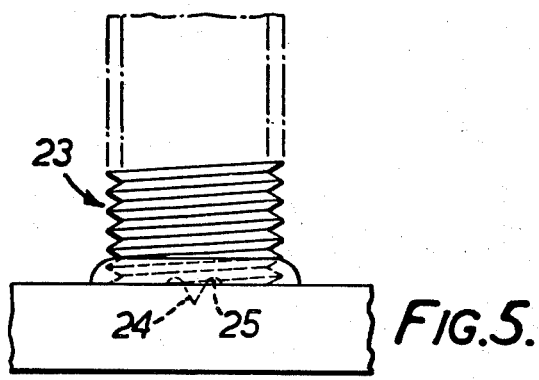
Figure 6:
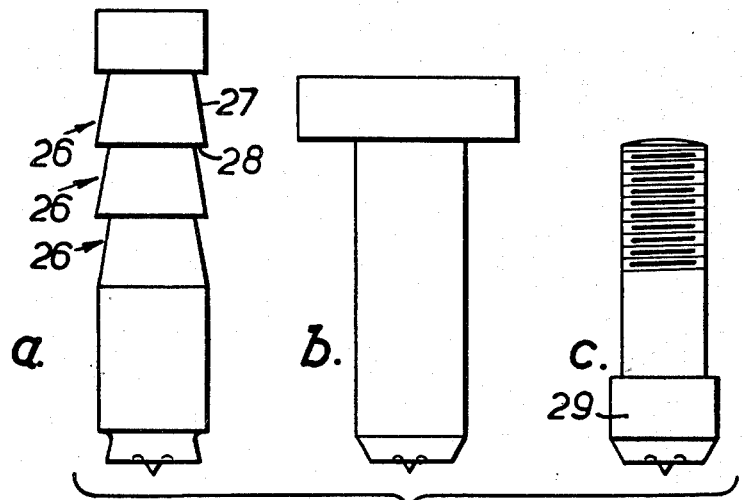
Figure 7:
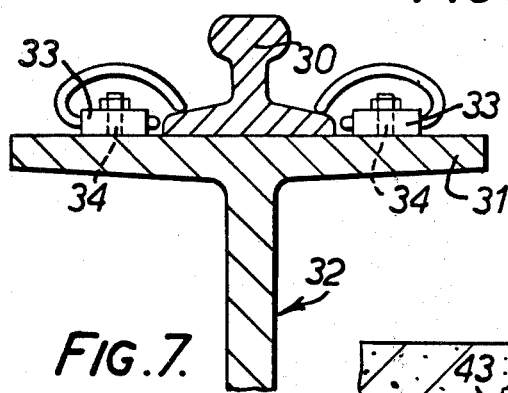

The invention may be performed in various ways and some embodiments thereof will now be described by way of example, with reference to the accompanying drawings, in which:

FIG. 1 is a side elevation of a screw-threaded stud according to the invention,

FIG. 2 is an axial section on an enlarged scale through the lower part of the stud of FIG. 1, when welded to a supporting metal plate, FIG. 3 is a side elevation of another screwthreaded stud according to the invention, FIG. 4 is an axial section on an enlarged scale through the lower part of the stud of FIG. 3 when welded to a supporting metal plate, FIG. 5 is a side elevation of a screw-threaded stud welded to a metal plate in accordance with the invention, FIG. 6 shows side elevations of other studs according to the invention, FIG. 7 is a diagrammatic sectional view through a rail track assembly mounted on a metal plate or flange and secured by anchorage clamps located by welded studs of the type illustrated in FIGS. 1 and 2 or 3 and 4, and FIG. 8 is a similar diagrammatic sectional view of a composite construction including a cast concrete beam or slab secured to a flange of a metal girder by means of a number of rag bolts of the type illustrated in FIG. 6.

In FIG. 1, a screw-threaded stud 1 is designed to be attached by welding to a horizontal flat metal surface, for example to a flange of a girder to form part of an upright anchorage for a horizontal track rail. The stud 1 is a mild steel circular section member, screw-threaded at its upper end 2 and plain at its lower end 3. An annular chamfer 4 is provided around the lower edge, on a conical surface having a half cone angle of approximately 30°. This tapered surface may be formed by forging but preferably by machining since this leaves a clean surface for the weld.

The flat lower end surface of the stud, which is of somewhat smaller diameter than the main shank owing to the tapered chamfer 4 has a small central conical projection 5, pointing along the stud axis and surrounded by a shallow annular groove 6. The height of the projection may be for example about 0.01 to 0.10 inch and the depth of the annular groove may be comparable in dimensions. The overall diameter of the groove may be approximately 0.5 inch.

To attach such a stud 1 to a flat horizontal metal surface 7 as shown in FIG. 2 it is merely necessary to remove obvious dirt, mill scale or the like from that surface, and form a locating punch mark 8 at the correct position on the metal surface, using a conventional tapered punch. The depth of the punch mark should be at least equal to the height of the projection 5 on the stud, so that the flat lower end face of the stud will bed down onto the metal surface 7 and so that the crater lip 9 that is formed around the punch depression will fit into the annular groove 6. Also, to ensure that the central projection 5 locates in the punch mark 8 and that this location is not affected by the crater lip 9 engaging in the groove, the depth of the groove 6 is preferably greater than the height of the projection, or in any case greater in relation to the height of the crater lip.

The stud 1 is then offered up to the metal surface 7 with the projection 5 fitting into the metal punch mark 8 and welded in position by conventional arc welding or gas welding equipment, such that the weld material forms an annular fillet 10 between the chamfered surface 4 and the opposing metal surface 7. The weld material will also enter partly into the interface zone where the flat end face of the stud lies close against the metal surface 7. This provides an effective weld, without excessive brittleness or susceptibility to fatigue failure, with accurate location ensured.

Referring now to FIGS. 3 and 4, a stud 11 has a cylindrical shank with an upper part 12 screw-threaded to receive a nut and a lower part 13 formed with a peripheral groove 14 shaped to provide an inclined part-conical undercut surface 15 running smoothly into a radius 16. In the lower end face of the stud there is formed a small conical projection 17 which extends slightly below the end face and is surrounded by a shallow annular groove 18, in a similar manner to the projection 5 and groove 6 of FIGS. 1 and 2. The projection 17 is designed to fit into a punched depression 19 in the surface of a metal plate 20 to which the stud 11 is to be welded. When punching the depression 19, as with the depression 8, a small crater lip 21 normally builds up, and this is accommodated in the groove 18 thus allowing the end face of the bolt to lie flush against the surface of the plate 20 with the stud accurately located on the plate for the actual welding operation.

In welding the stud 11 to the plate 20 the weld material 22 is caused to fill the annular groove 14 and the height of the weld is preferably such that it rises above the $\mu$ upper edge of the groove as shown in FIG. 4. In making the weld, part of the adjacent material of the stud and the metal plate 20 will also be combined in the weld, but for clarity this is not shown in FIG. 4. It is found that a welded connection formed as described is appreciably stronger than a welded joint made by simply moving a welding tool around the lower end of a conventional plain stud.

As an example of dimensions, with a 1 inch diameter stud 11 the axial dimension of the groove 14 may be 3/16 inch and the height of the weld ¼ inch. The length of the stud is as desired, but common lengths will be in the 2 to 4 inches range.

FIG. 5 illustrates another embodiment of the invention where a bolt 23 is screw-threaded overall, so that the screw thread extends down to the flat end face which is provided with a conical projection 24 and surrounding groove 25 as in previous Figures. The weld material is applied around the lower end of this bolt so as to fill in at least one turn of the screw thread and preferably at least two turns on one side. In this construction there is an undercut surface at the extreme lower end of the bolt only above part of its periphery, owing to the helix angle of the screw. If the weld extends upwards for at least twice the pitch of the thread, however, there will be at least one effective undercut surface around the whole periphery.

FIG. 6 shows at (a) a rag bolt with a lower end similar to that of FIGS. 3 and 4 but the shank is rather longer and at its upper end is formed with three rings 26 each having a shallow inclined surface 27 extending inwardly and upwardly, and joining a shoulder 28 whose under surface lies perpendicular to the axis of the bolt. The junction between these surfaces 27 and 28 may be radiused to reduce risk of fracture. This rag bolt is designed to be cast into concrete which closely fits around the grooves so that the concrete body is rigidly attached to the bolt and hence to the metal plate to which the bolt is welded.

In FIG. 6b the lower end of the stud is prepared in the same manner as FIGS. 1 and 2 but instead of a screw thread it has a plain cylindrical shank or stem with a head secured in position on the upper end by forging, rivetting or welding. The head is circular but may be square or any other shape as required.

In FIG. 6c the lower end of the stud is squared and the lower edge of this square base 29 is chamfered to accommodate the fillet weld. The centre of the base underface has a projection and surrounding annular groove for location, as with previous embodiments.

The construction illustrated in FIG. 7 comprises a track rail 30 of heavy cross-section designed to carry a very heavy moving load such as a gantry crane. This track rail is mounted on the top metal horizontal flange 31 of a girder 32 which may be bedded in a concrete mass or may be supported overhead. The track rail 30 is secured to the flange 31 by a series of clamps 33 positioned along both sides, each clamp being secured to the flange 31 by an anchorage stud 34 formed and welded to the flange as illustrated in FIGS. 1 and 2, FIGS. 3 and 4, 5, or FIG. 6c. If the square base studs of FIG. 6c are used, they are set on the flange 31 so that the diagonals of the bases are parallel and perpendicular to the rail direction. This avoids welding across the planes of stress which are longitudinal of the structure. The clamps are preferably as described in co-pending British Application No. 8276/70.

Figure 8:
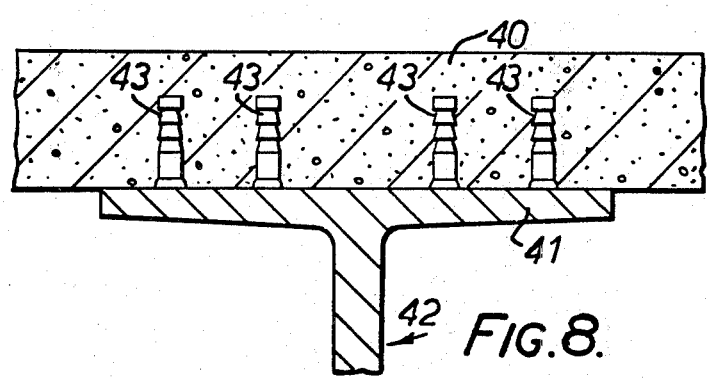

In the construction illustrated in FIG. 8, a concrete beam or slab 40, usually with internal reinforcement (not shown), is mounted on and secured to the top flange 41 of a metal girder 42 by means of a series of rag bolts 43 each formed as illustrated in FIG. 6a and welded to the flange 41 in the manner described.

We claim:

1. A welded stud construction comprising a metal stud and a metal base member, the metals of the stud and base member being similar, there being a peripheral cut-away portion at one end of the stud, a fillet weld in said peripheral cut-away portion that integrates said stud and base member, said cut-away portion being undercut into the side of the stud and defining a terminal end having a single frusto-conical surface whose large diameter end is at the end of the stud adjacent the base member, said cut-away portion being smoothly curved from its smaller end outwardly and away from the base member to the flank of the stud.

2. A welded stud construction as claimed in claim 1, in which the fillet weld extends beyond the cut-away portion over part of said flank of the stud.

* * * * *